US012359082B2

(12) United States Patent
Ward et al.

(10) Patent No.: US 12,359,082 B2
(45) Date of Patent: Jul. 15, 2025

(54) METHOD OF INKJET PRINTING

(71) Applicant: Fujifilm Speciality Ink Systems Limited, Broadstairs (GB)

(72) Inventors: Jeremy Ward, Broadstairs (GB); Matthew Kite, Broadstairs (GB); Sarah Canning, Broadstairs (GB)

(73) Assignee: Fujifilm Speciality Ink Systems Limited, Broadstairs (GB)

( * ) Notice: Subject to any disclaimer, the term of this patent is extended or adjusted under 35 U.S.C. 154(b) by 383 days.

(21) Appl. No.: 17/923,375

(22) PCT Filed: May 5, 2020

(86) PCT No.: PCT/GB2020/051103
§ 371 (c)(1),
(2) Date: Nov. 4, 2022

(87) PCT Pub. No.: WO2021/224582
PCT Pub. Date: Nov. 11, 2021

(65) Prior Publication Data
US 2023/0203331 A1    Jun. 29, 2023

(51) Int. Cl.
*C09D 11/38* (2014.01)
*B41J 2/21* (2006.01)
(Continued)

(52) U.S. Cl.
CPC ............. *C09D 11/38* (2013.01); *B41J 2/2107* (2013.01); *B41J 11/00214* (2021.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

2002/0149659 A1* 10/2002 Wu ...................... C09D 11/101
347/102
2009/0176072 A1* 7/2009 Ward ................... C09D 11/101
427/256

(Continued)

FOREIGN PATENT DOCUMENTS

| EP | 0465039 A1 | 1/1992 |
| JP | 2018172480 A | 11/2018 |
| WO | 2018/197852 A1 | 11/2018 |

OTHER PUBLICATIONS

International Search Report for corresponding PCT Application No. PCT/GB2020/051103 mailed Feb. 4, 2021.

*Primary Examiner* — Manish S Shah
(74) *Attorney, Agent, or Firm* — Wood, Phillips, Katz, Clark & Mortimer

(57) ABSTRACT

The present invention provides a method of inkjet printing, comprising: (i) inkjet printing an inkjet ink on to a substrate, wherein the ink comprises: an N-vinyl monomer selected from N-vinyl caprolactam, N-vinyl pyrrolidone, N-vinyl piperidone, N-vinyl carbazole, N-vinyl formamide, N-vinyl indole, N-vinyl imidazole, N-vinyl acetamide, and mixtures thereof; one or more difunctional monomers; and a radical photoinitiator; and (ii) curing the ink by exposing the printed ink to a UV radiation source, wherein the UV radiation source moves relative to the substrate at a speed of 70 m/min or more.

13 Claims, 3 Drawing Sheets

(51) Int. Cl.
*B41J 11/00* (2006.01)
*C09D 11/037* (2014.01)
*C09D 11/101* (2014.01)
*C09D 11/107* (2014.01)
*C09D 11/30* (2014.01)
*C09D 11/322* (2014.01)

(52) U.S. Cl.
CPC .......... *C09D 11/037* (2013.01); *C09D 11/101* (2013.01); *C09D 11/107* (2013.01); *C09D 11/30* (2013.01); *C09D 11/322* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| | | | | |
|---|---|---|---|---|
| 2009/0317559 | A1* | 12/2009 | Belelie | C09D 11/30 427/487 |
| 2010/0021698 | A1* | 1/2010 | Chretien | B41M 7/0081 427/494 |
| 2015/0124032 | A1* | 5/2015 | De Mondt | B41M 5/0023 347/102 |
| 2016/0200923 | A1* | 7/2016 | Loccufier | C09D 11/322 428/195.1 |
| 2017/0043593 | A1* | 2/2017 | Steert | G09F 7/00 |
| 2017/0306179 | A9* | 10/2017 | Brandstein | C09D 179/02 |
| 2017/0313894 | A1* | 11/2017 | Ward | B41J 11/0015 |
| 2020/0062983 | A1* | 2/2020 | Runacre | C09D 11/101 |

* cited by examiner

METHOD OF INKJET PRINTING

FIELD OF THE INVENTION

This invention relates to a method of printing, in particular to a method of inkjet printing, which is suitable for high-speed printing applications.

BACKGROUND OF THE INVENTION

In inkjet printing, minute droplets of black, white or coloured ink are ejected in a controlled manner from one or more reservoirs or printing heads through narrow nozzles onto a substrate, which is moving relative to the reservoirs. The ejected ink forms an image on the substrate. The resulting image should be as high quality as possible.

For high-speed printing, the inks must flow rapidly from the printing heads, and, to ensure that this happens, they must have in use a low viscosity, typically 100 mPas or less at 25° C., although in most applications the viscosity should be 50 mPas or less, and often 25 mPas or less. Typically, when ejected through the nozzles, the ink has a viscosity of less than 25 mPas, preferably 5-15 mPas and most preferably between 7-11 mPas at the jetting temperature, which is often elevated to, but not limited to 40-50° C. (the ink might have a much higher viscosity at ambient temperature). The inks must also be resistant to drying or crusting in the reservoirs or nozzles. For these reasons, inkjet inks for application at or near ambient temperatures are commonly formulated to contain a large proportion of a mobile liquid vehicle or solvent such as water or a low-boiling solvent or mixture of solvents.

Another type of inkjet ink contains unsaturated organic compounds, termed monomers and/or oligomers which polymerise by irradiation, commonly with ultraviolet light, in the presence of a photoinitiator. This type of ink has the advantage that it is not necessary to evaporate the liquid phase to dry the print; instead the print is exposed to radiation to cure or harden it, a process which is more rapid than evaporation of solvent at moderate temperatures.

Inks, which cure by the polymerisation of monomers, may contain a wide variety of monofunctional, difunctional and multifunctional monomers. The challenge is to provide the necessary printing properties, such as good adhesion and rapid curing, whilst providing a high-quality image, without compromising the jetting properties.

For high-speed printing applications, such as single-pass label printing, very high cure speeds are required, for example around 100 m/min or above. By cure speed is meant the speed at which the actinic radiation source moves relative to the substrate.

In order to increase the cure speed, UV inkjet inks are formulated with difunctional and multifunctional acrylate monomers. It is difficult to achieve very high cure speed of around 100 m/min or above, which is required for some high-speed printing applications, with difunctional monomers alone. Therefore, multifunctional monomers are typically included to achieve such high cure speeds. However, inks produced from these types of materials are usually high viscosity, inflexible and suffer from poor adhesion/film shrinkage and consequent substrate embrittlement. In order to offset film shrinkage and substrate embrittlement, monofunctional monomers can be included. However, the inclusion of monofunctional monomers, which are slow curing (as they do not homopolymerise), reduces the cure speed of the ink, which is not acceptable for high-speed printing applications.

An alternative way to increase the cure speed for high-speed printing applications, such as single-pass label printing, is to include radiation-curable oligomers or passive resins, whose higher molecular weight leads to a reduction in the number of bonds that must be formed during the curing process. However, when each link is formed the bond length between the repeat units reduces leading to shrinkage of the cured film and unless this is controlled, stress is imparted to the substrate. With plastic substrates this film shrinkage can lead to severe embrittlement of the printed article and post-print finishing, such as guillotining, becomes problematic. Again, in order to reduce shrinkage, monofunctional monomers can be included, but again, this is avoided for high-speed printing applications as this reduces the cure speed because of the very low cure speeds associated with monofunctional monomers.

Therefore, there remains a need in the art for a method of inkjet printing that uses a fast cure speed required for high-speed printing applications whilst maintaining a high-quality image.

BRIEF SUMMARY OF THE INVENTION

Accordingly, the present invention provides a method of inkjet printing, comprising:

(i) inkjet printing an inkjet ink on to a substrate, wherein the ink comprises: an N-vinyl monomer selected from N-vinyl caprolactam, N-vinyl pyrrolidone, N-vinyl piperidone, N-vinyl carbazole, N-vinyl formamide, N-vinyl indole, N-vinyl imidazole, N-vinyl acetamide, and mixtures thereof; one or more difunctional monomers; and a radical photoinitiator; and (ii) curing the ink by exposing the printed ink to a UV radiation source, wherein the UV radiation source moves relative to the substrate at a speed of 70 m/min or more.

It has surprisingly been found that a method of inkjet printing using an inkjet ink comprising: an N-vinyl monomer selected from N-vinyl caprolactam, N-vinyl pyrrolidone, N-vinyl piperidone, N-vinyl carbazole, N-vinyl formamide, N-vinyl indole, N-vinyl imidazole, N-vinyl acetamide, and mixtures thereof; one or more difunctional monomers; and a radical photoinitiator enables the ink to be cured using a UV radiation source moving relative to the substrate at a speed of 70 m/min or more. It is surprising that such a fast cure speed required for high-speed printing applications can be achieved, whilst maintaining a high-quality image, when the ink contains the N-vinyl monomer in combination with the one or more difunctional monomers.

It is difficult to formulate inkjet inks having a high enough cure speed for high-speed printing comprising difunctional monomers alone. It is normally necessary to include multifunctional monomers and/or radiation-curable oligomers and/or passive resins to increase the cure speed. However, the inclusion of such components has a negative impact on the printed image. The inclusion of monofunctional monomers can offset the negative impact on the printed image, but reduces cure speed because of the slow-curing nature of monofunctional monomers.

However, the inventors have found that the inclusion of a particular monofunctional monomer, an N-vinyl monomer selected from N-vinyl caprolactam, N-vinyl pyrrolidone, N-vinyl piperidone, N-vinyl carbazole, N-vinyl formamide, N-vinyl indole, N-vinyl imidazole, N-vinyl acetamide, and mixtures thereof, to an ink comprising difunctional monomer, in fact surprisingly increases cure speed, rather than decreasing cure speed, and maintains a high-quality image.

It has the advantage of lowering viscosity, increasing flexibility and adhesion, which would be expected from the inclusion of a monofunctional monomer. However, it does not decrease cure speed, which would be expected from the inclusion of a slow curing monofunctional monomer, such as an N-vinyl monomer selected from N-vinyl caprolactam, N-vinyl pyrrolidone, N-vinyl piperidone, N-vinyl carbazole, N-vinyl formamide, N-vinyl indole, N-vinyl imidazole, N-vinyl acetamide, and mixtures thereof. In fact, it markedly increases cure speed. An inkjet ink comprising an N-vinyl monomer selected from N-vinyl caprolactam, N-vinyl pyrrolidone, N-vinyl piperidone, N-vinyl carbazole, N-vinyl formamide, N-vinyl indole, N-vinyl imidazole, N-vinyl acetamide, and mixtures thereof, alone has a remarkably slow cure speed, which is unsurprising. However, surprisingly, the inclusion of an N-vinyl monomer selected from N-vinyl caprolactam, N-vinyl pyrrolidone, N-vinyl piperidone, N-vinyl carbazole, N-vinyl formamide, N-vinyl indole, N-vinyl imidazole, N-vinyl acetamide, and mixtures thereof to the inkjet ink of the invention increases cure speed, rather than decreases cure speed.

BRIEF DESCRIPTION OF THE DRAWINGS

The present invention will now be described with reference to the drawings, in which.

DETAILED DESCRIPTION OF THE INVENTION

Figure 1:
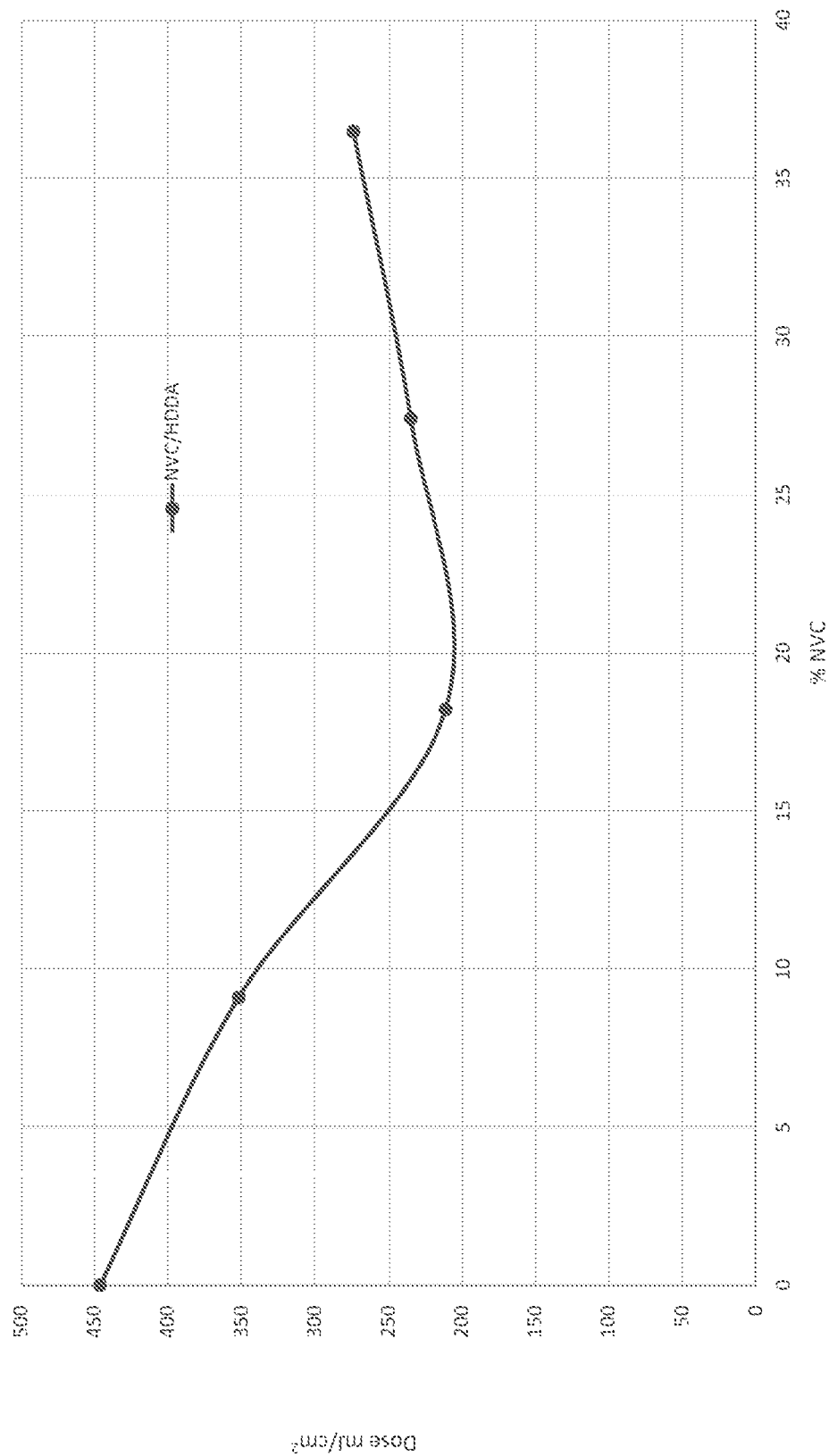
FIG. 1 is a graph showing dose required for cure for inks of the invention containing NVC/HDDA blends compared to a comparative ink containing just HDDA.

The method of inkjet printing of the present invention comprises: (i) inkjet printing an inkjet ink on to a substrate, wherein the ink comprises: an N-vinyl monomer selected from N-vinyl caprolactam, N-vinyl pyrrolidone, N-vinyl piperidone, N-vinyl carbazole, N-vinyl formamide, N-vinyl indole, N-vinyl imidazole, N-vinyl acetamide, and mixtures thereof; one or more difunctional monomers; and a radical photoinitiator.

The inkjet ink used in the method of the present invention comprises an N-vinyl monomer selected from N-vinyl caprolactam, N-vinyl pyrrolidone, N-vinyl piperidone, N-vinyl carbazole, N-vinyl formamide, N-vinyl indole, N-vinyl imidazole, N-vinyl acetamide, and mixtures thereof.

N-Vinyl monomers selected from N-vinyl caprolactam, N-vinyl pyrrolidone, N-vinyl piperidone, N-vinyl carbazole, N-vinyl formamide, N-vinyl indole, N-vinyl imidazole, N-vinyl acetamide, and mixtures thereof are well-known monomers in the art and a detailed description is not required. Each of the N-vinyl monomers has a vinyl group attached to the nitrogen atom of the monomer as can be seen from the chemical structures below.

N-Vinyl caprolactam (NVC) has the following chemical structure:

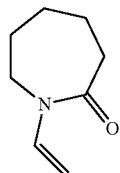

N-Vinyl pyrrolidone has the following chemical structure:

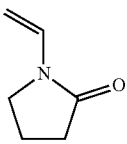

N-Vinyl piperidone has the following chemical structure:

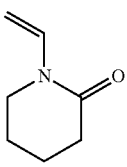

N-Vinyl carbazole has the following chemical structure:

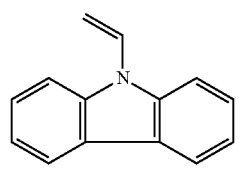 [SMILES: C=CN1c2ccccc2Cc2ccccc21]

N-Vinyl formamide has the following chemical structure:

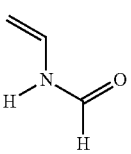

N-Vinyl indole has the following chemical structure:

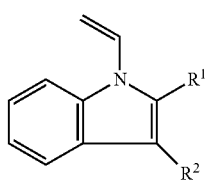

N-Vinyl imidazole has the following chemical structure:

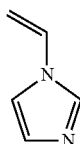

N-Vinyl acetamide has the following chemical structure:

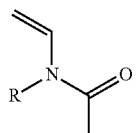

The substituents of N-vinyl indole and N-vinyl acetamide are not limited other than by the constraints imposed by the use in an ink-jet ink, such as viscosity, stability, toxicity etc. The substituents are typically hydrogen, alkyl, cycloalkyl, aryl and combinations thereof, any of which may be interrupted by heteroatoms. Non-limiting examples of substituents commonly used in the art include $C_{1-18}$ alkyl, $C_{3-18}$ cycloalkyl, $C_{6-10}$ aryl and combinations thereof, such as $C_{6-10}$ aryl- or $C_{3-18}$ cycloalkyl-substituted $C_{1-18}$ alkyl, any of which may be interrupted by 1-10 heteroatoms, such as oxygen or nitrogen, with nitrogen further substituted by any of the above described substituents.

In a preferred embodiment, the N-vinyl monomer is NVC.

In a preferred embodiment, the inkjet ink used in the method of the present invention comprises 5-40% by weight, preferably 10-40%, more preferably 10-30%, most preferably 15-25% of an N-vinyl monomer selected from N-vinyl caprolactam, N-vinyl pyrrolidone, N-vinyl piperidone, N-vinyl carbazole, N-vinyl formamide, N-vinyl indole, N-vinyl imidazole, N-vinyl acetamide, and mixtures thereof, based on the total weight of the ink.

As is known in the art, monomers may possess different degrees of functionality, which include mono, di, tri and higher functionality monomers.

The inkjet ink used in the method of the present invention contains one or more difunctional monomers. Difunctional has its standard meaning, i.e. two groups, which take part in the polymerisation reaction on curing. Examples of difunctional monomers include difunctional (meth)acrylate monomers, divinyl ether monomers and vinyl ether (meth)acrylate monomers.

In a preferred embodiment, the inkjet ink used in the method of the present invention comprises 20-80% by weight, more preferably 30-60% by weight, of one or more difunctional monomers, based on the total weight of the ink. The amount refers to the total amount of all monomers within this category (i.e. difunctional monomers).

In a preferred embodiment, the difunctional monomers comprise difunctional (meth)acrylate monomers. By difunctional (meth)acrylate monomers, it is meant difunctional monomers in which the only radiation-curable functional groups present in the monomer are (meth)acrylate groups. Such difunctional monomers in which the only radiation-curable functional groups present in the monomer are (meth)acrylate groups are well known in the art and a detailed description is therefore not required. In the case of a difunctional monomer in which the only radiation-curable functional groups present in the monomer are (meth)acrylate groups, the two groups which take part in the polymerisation reaction on curing are both (meth)acrylate groups.

Examples include hexanediol diacrylate, 1,8-octanediol diacrylate, 1,9-nonanediol diacrylate, 1,10-decanediol diacrylate (DDDA), 1,11-undecanediol diacrylate and 1,12-dodecanediol diacrylate, polyethyleneglycol diacrylate (for example tetraethyleneglycol diacrylate), dipropyleneglycol diacrylate (DPGDA), tricyclodecane dimethanol diacrylate (TCDDMDA), neopentylglycol diacrylate, 3-methyl-1,5-pentanediol diacrylate (3MPDDA), and the acrylate esters of ethoxylated or propoxylated glycols and polyols, for example, propoxylated neopentylglycol diacrylate (NPGPODA), and mixtures thereof. Also included are esters of methacrylic acid (i.e. methacrylates), such as hexanediol dimethacrylate, 1,8-octanediol dimethacrylate, 1,9-nonanediol dimethacrylate, 1,10-decanediol dimethacrylate, 1,11-undecanediol dimethacrylate and 1,12-dodecanediol dimethacrylate, triethyleneglycol dimethacrylate, diethyleneglycol dimethacrylate, ethyleneglycol dimethacrylate, 1,4-butanediol dimethacrylate and mixtures thereof.

In a preferred embodiment, the one or more difunctional monomers in which the only radiation-curable functional groups present in the monomer are (meth)acrylate groups comprises hexanediol diacrylate (HDDA).

The inkjet ink used in the method of the present invention preferably comprises 20-80% by weight, more preferably 30-60% by weight, of one or more difunctional monomers in which the only radiation-curable functional groups present in the monomer are (meth)acrylate groups, based on the total weight of the ink.

In one embodiment, the difunctional monomers comprise divinyl ether monomers. Such difunctional monomers are well known in the art and a detailed description is not required. Examples include triethylene glycol divinyl ether, diethylene glycol divinyl ether, 1,4-cyclohexanedimethanol divinyl ether and mixtures thereof.

In one embodiment, the difunctional monomers comprise vinyl ether (meth)acrylate monomers. Such difunctional monomers are well known in the art and a detailed description is not required. Examples include 2-(2-vinyloxy ethoxy) ethyl acrylate ("VEEA"), 2-(2-vinyloxy ethoxy)ethyl methacrylate ("VEEM") and mixtures thereof.

In a preferred embodiment, the ink comprises 10% or less of difunctional monomers, other than the one or more difunctional monomers in which the only radiation-curable functional groups present in the monomer are (meth)acrylate groups.

In a particularly preferred embodiment, the one or more difunctional monomers in which the only radiation-curable functional groups present in the monomer are (meth)acrylate groups comprise hexanediol diacrylate (HDDA), and the ink comprises 10% or less of difunctional monomers, other than the one or more difunctional monomers in which the only radiation-curable functional groups present in the monomer are (meth)acrylate groups.

In one embodiment, no further difunctional monomers, other than difunctional monomers in which the only radiation-curable functional groups present in the monomer are (meth)acrylate groups, are present in the ink.

In a preferred embodiment, the inkjet ink used in the method of the present invention comprises 9% or less by weight of a monofunctional monomer, other than the N-vinyl monomer, together with a multifunctional monomer, based on the total weight of the ink.

Preferably, the inkjet ink used in the method of the present invention comprises 9% or less by weight, 5% by weight, 2% or less by weight, 1% or less by weight or is substantially free, of a monofunctional monomer, other than the N-vinyl monomer, together with a multifunctional monomer, based on the total weight of the ink.

By together with is meant the combined amounts of a monofunctional monomer, other than the N-vinyl monomer, and a multifunctional monomer. Put another way, the total amount of a monofunctional monomer, other than the N-vinyl monomer, and a multifunctional monomer.

By substantially free is meant that only small amounts will be present, for example as impurities in the radiation-curable materials present or as a component in a commercially available pigment dispersion.

Monofunctional monomers, other than the N-vinyl monomer selected from N-vinyl caprolactam, N-vinyl pyrrolidone, N-vinyl piperidone, N-vinyl carbazole, N-vinyl formamide, N-vinyl indole, N-vinyl imidazole, N-vinyl acetamide, and mixtures thereof, are well known in the art and a detailed description is not required.

A radiation-curable monofunctional monomer has one functional group, which takes part in the polymerisation reaction on curing. The polymerisable groups can be any group that are capable of polymerising upon exposure to radiation and are preferably selected from a (meth)acrylate group and a vinyl ether group.

The substituents of the monofunctional monomers, other than the N-vinyl monomer, are not limited other than by the constraints imposed by the use in an inkjet ink, such as viscosity, stability, toxicity etc. The substituents are typically alkyl, cycloalkyl, aryl and combinations thereof, any of which may be interrupted by heteroatoms. Non-limiting examples of substituents commonly used in the art include $C_{1-18}$ alkyl, $C_{3-18}$ cycloalkyl, $C_{6-10}$ aryl and combinations thereof, such as $C_{6-10}$ aryl- or $C_{3-18}$ cycloalkyl-substituted $C_{1-18}$ alkyl, any of which may be interrupted by 1-10 heteroatoms, such as oxygen or nitrogen, with nitrogen further substituted by any of the above described substituents. The substituents may together also form a cyclic structure.

An example of monofunctional monomer, other than the N-vinyl monomer, include monofunctional (meth)acrylate monomers, which are well known in the art and are preferably the esters of acrylic acid. A detailed description is therefore not required. Mixtures of (meth)acrylates may also be used.

Monofunctional (meth)acrylate monomers include cyclic monofunctional (meth)acrylate monomers and acyclic-hydrocarbon monofunctional (meth)acrylate monomers.

The substituents of the cyclic monofunctional (meth)acrylate monomer are typically cycloalkyl, aryl and combinations thereof, any of which may be interrupted by heteroatoms and/or substituted by alkyl. Non-limiting examples of substituents commonly used in the art include $C_{3-18}$ cycloalkyl, $C_{6-10}$ aryl and combinations thereof, any of which may substituted with alkyl (such as $C_{1-18}$ alkyl) and/or any of which may be interrupted by 1-10 heteroatoms, such as oxygen or nitrogen, with nitrogen further substituted by any of the above described substituents. The substituents may together also form a cyclic structure.

Cyclic monofunctional (meth)acrylate monomer include isobornyl acrylate (IBOA), phenoxyethyl acrylate (PEA), cyclic TMP formal acrylate (CTFA), tetrahydrofurfuryl acrylate (THFA), (2-methyl ethyl-1,3-dioxolane-4-yl) methyl acrylate (MEDA/Medol-10), 4-tert-butylcyclohexyl acrylate (TBCHA) and 3,3,5-trimethylcyclohexyl acrylate (TMCHA).

The substituents of the acyclic-hydrocarbon monofunctional (meth)acrylate monomer are typically alkyl, which may be interrupted by heteroatoms. A non-limiting example of a substituent commonly used in the art is $C_{1-18}$ alkyl, which may be interrupted by 1-10 heteroatoms, such as oxygen or nitrogen, with nitrogen further substituted.

The acyclic-hydrocarbon monofunctional (meth)acrylate monomer contains a linear or branched $C_6$-$C_{20}$ group and is typically selected from octa/decyl acrylate (ODA), 2-(2-ethoxyethoxy)ethyl acrylate, tridecyl acrylate (TDA), iso-decyl acrylate (IDA), lauryl acrylate, and mixtures thereof.

Further examples of monofunctional monomers, other than the N-vinyl monomer, include α,β-unsaturated ether monofunctional monomer, which can polymerise by free-radical polymerisation. Examples are well known in the art and include vinyl ethers such as ethylene glycol monovinyl ether.

Further examples of monofunctional monomers, other than the N-vinyl monomer selected from N-vinyl caprolactam, N-vinyl pyrrolidone, N-vinyl piperidone, N-vinyl carbazole, N-vinyl formamide, N-vinyl indole, N-vinyl imidazole, N-vinyl acetamide, and mixtures thereof, include other N-vinyl amide monomers and/or N-acryloyl amine monomers.

N-Vinyl amide monomers are well-known monomers in the art and a detailed description is therefore not required. N-Vinyl amide monomers have a vinyl group attached to the nitrogen atom of an amide which may be further substituted in an analogous manner to the (meth)acrylate monomers. N-Vinyl caprolactam, N-vinyl pyrrolidone, N-vinyl piperidone, N-vinyl formamide and N-vinyl acetamide are examples of N-vinyl amide monomers.

N-Acryloyl amine monomers are also well-known in the art. N-Acryloyl amine monomers also have a vinyl group attached to an amide but via the carbonyl carbon atom and again may be further substituted in an analogous manner to the (meth)acrylate monomers. An example of an N-acryloyl amine monomer is N-acryloylmorpholine (ACMO).

Multifunctional monomers (tri- and higher-functional) are also well known in the art and a detailed description is therefore not required. Multifunctional has its standard meaning, i.e. tri or higher, that is three or more groups, respectively, which take part in the polymerisation reaction on curing. Multifunctional monomers do not include difunctional (meth)acrylate monomers. Usually, the multifunctional (meth)acrylate monomer has a degree of functionality of four or more, e.g. 4-8.

Examples of the multifunctional monomers include trimethylolpropane triacrylate (TMPTA), pentaerythritol triacrylate, tri(propylene glycol) triacrylate, bis(pentaerythritol) hexaacrylate, and the acrylate esters of ethoxylated or propoxylated glycols and polyols, for example, ethoxylated trimethylolpropane triacrylate, and mixtures thereof. Suitable multifunctional (meth)acrylate monomers also include esters of methacrylic acid (i.e. methacrylates), such as trimethylolpropane trimethacrylate. Mixtures of (meth)acrylates may also be used. A preferred multifunctional (meth)acrylate monomer is TMPTA.

In a preferred embodiment the inkjet ink used in the method of the present invention comprises 5% or less by weight of monofunctional monomer, other than the N-vinyl monomer selected from N-vinyl caprolactam, N-vinyl pyrrolidone, N-vinyl piperidone, N-vinyl carbazole, N-vinyl formamide, N-vinyl indole, N-vinyl imidazole, N-vinyl acetamide, and mixtures thereof, based on the total weight of the ink.

Preferably, the inkjet ink used in the method of the present invention comprises 5% or less by weight, 4% or less by weight, 3% or less by weight, 2% or less by weight, 1% or less by weight or is substantially free of monofunctional monomer, other than the N-vinyl monomer selected from N-vinyl caprolactam, N-vinyl pyrrolidone, N-vinyl piperidone, N-vinyl carbazole, N-vinyl formamide, N-vinyl indole, N-vinyl imidazole, N-vinyl acetamide, and mixtures thereof, based on the total weight of the ink.

In a preferred embodiment the inkjet ink used in the method of the present invention comprises 5% or less by weight of a multifunctional monomer, based on the total weight of the ink.

Preferably, the inkjet ink used in the method of the present invention comprises 5% or less by weight, 4% or less by weight, 3% or less by weight, 2% or less by weight, 1% or less by weight or is substantially free of a multifunctional monomer, based on the total weight of the ink.

It has surprisingly been found that the inkjet ink used in the method of the present invention has a high cure speed despite restricting the combined amount of a monofunctional monomer, other than the N-vinyl monomer, and a multifunctional monomer to 9% or less by weight, based on the total weight of the ink.

By 9% or less, it is meant the normal mathematical meaning of 9% or less, namely 9.4% or less, excluding 9.5% or above. The other amounts given herein take the same normal mathematical meaning.

For the avoidance of doubt, (meth)acrylate is intended herein to have its standard meaning, i.e. acrylate and/or methacrylate. Mono and difunctional are intended to have their standard meanings, i.e. one or two groups, respectively, which take part in the polymerisation reaction on curing. Multifunctional (which does not include difunctional) is intended to have its standard meanings, i.e. three or more groups, respectively, which take part in the polymerisation reaction on curing.

Monomers typically have a molecular weight of less than 600, preferably more than 200 and less than 450.

Monomers are typically added to inkjet inks to reduce the viscosity of the inkjet ink. They therefore preferably have a viscosity of less than 150 mPas at 25° C., more preferably less than 100 mPas at 25° C. and most preferably less than 20 mPas at 25° C. Monomer viscosities can be measured using an ARG2 rheometer manufactured by T.A. Instruments, which uses a 40 mm oblique/2° steel cone at 25° C. with a shear rate of 25 $s^{-1}$.

In a preferred embodiment, the inkjet ink used in the method of the present invention comprises 5% or less of a passive resin, based on the total weight of the ink.

A passive resin is a high molecular weight polymer. Passive resins typically have a weight-average molecular weight of 70-200 KDa and more typically 100-150 KDa, as determined by GPC with polystyrene standards.

The passive resin does not enter into the curing process. A trivial number of polymerisable functional groups may be residual from the synthesis of the passive resin but these are not considered significant. Examples of a passive resin are epoxy, polyester, vinyl, ketone, nitrocellulose, phenoxy or acrylate resins, e.g. a poly(methyl (meth)acrylate) resin.

Preferably, the inkjet ink used in the method of the present invention comprises 4% or less by weight, 3% or less by weight, 2% or less by weight, 1% or less by weight or is substantially free of a passive resin, based on the total weight of the ink.

It has surprisingly been found that the inkjet ink used in the method of the present invention has a high cure speed despite restricting the amount of a passive resin to 5% or less by weight, based on the total weight of the ink.

The inkjet ink used in the method of the present invention may comprise a radiation-curable (i.e. polymerisable) oligomer, such as a (meth)acrylate oligomer.

The term "curable oligomer" has its standard meaning in the art, namely that the component is partially reacted to form a pre-polymer having a plurality of repeating monomer units, which is capable of further polymerisation. The oligomer typically has a molecular weight of at least 450 Da and more typically at least 600 Da (whereas monomers typically have a molecular weight below these values). The molecular weight is typically 4,000 Da or less. Molecular weights (number average) can be calculated if the structure of the oligomer is known or molecular weights can be measured using gel permeation chromatography using polystyrene standards.

The degree of functionality of the oligomer determines the degree of crosslinking and hence the properties of the cured ink. The oligomer is typically multifunctional meaning that it contains on average more than one reactive functional group per molecule. The average degree of functionality is typically from 2 to 6.

Oligomers are typically added to inkjet inks to increase the viscosity of the inkjet ink or to provide film-forming properties such as hardness or cure speed. They therefore typically have a viscosity of 150 mPas or above at 25° C., for example a viscosity of 0.5 to 10 Pas at 50° C. Oligomer viscosities can be measured using an ARG2 rheometer manufactured by T.A. Instruments, which uses a 40 mm oblique/2° steel cone at 60° C. with a shear rate of 25 $s^{-1}$.

Radiation-curable oligomers comprise a backbone, for example a polyester, urethane, epoxy or polyether backbone, and one or more radiation-curable groups. The oligomer typically comprises a polyester backbone. The polymerisable group can be any group that is capable of polymerising upon exposure to radiation, and is usually (meth)acrylate. The oligomer may include amine functionality, as the amine acts as an activator without the drawback of migration associated with low-molecular weight amines.

Particularly preferred radiation-curable oligomers are polyester acrylate oligomers as these have excellent adhesion and elongation properties. Most preferred are di-, tri-, tetra-, penta- or hexa-functional polyester acrylates, as these yield films with good solvent resistance.

More preferably, the radiation-curable oligomer is a polyester acrylate oligomer. Such radiation-curable oligomers are commercially available as CN964A85 from Arkema and UVP6600 from Kromachem.

Other suitable examples of radiation-curable oligomers include epoxy based materials such as bisphenol A epoxy acrylates and epoxy novolac acrylates, which have fast cure speeds and provide cured films with good solvent resistance.

In a preferred embodiment, the inkjet ink used in the method of the present invention comprises 5% or less by weight of a radiation-curable (i.e. polymerisable) oligomer, based on the total weight of the ink. Preferably, the inkjet ink used in the method of the present invention comprises 4% or less by weight, 3% or less by weight, 2% or less by weight, 1% or less by weight or is substantially free of a radiation-curable (i.e. polymerisable) oligomer, based on the total weight of the ink.

It has surprisingly been found that the inkjet ink used in the method of the present invention has a high cure speed despite restricting the amount of a radiation-curable oligomer to 5% or less by weight, based on the total weight of the ink.

Preferably, the inkjet ink used in the method of the present invention comprises 5% or less by weight, 4% or less by weight, 3% or less by weight, 2% or less by weight, 1% or less by weight, or is substantially free, of a passive resin together with a radiation-curable oligomer, based on the total weight of the ink.

It has surprisingly been found that the inkjet ink used in the method of the present invention has a high cure speed despite restricting the combined amount of a passive resin and a radiation-curable oligomer to 5% or less by weight, based on the total weight of the ink.

More preferably, the inkjet ink used in the method of the present invention comprises 9% or less by weight, 5% by weight, 2% or less by weight, 1% or less by weight or is substantially free, of a monofunctional monomer other than the N-vinyl monomer, together with a multifunctional monomer, a passive resin and a radiation-curable oligomer, based on the total weight of the ink.

By together with is meant the combined amounts of a monofunctional monomer, other than the N-vinyl monomer, a multifunctional monomer, a passive resin and a radiation-curable oligomer. Put another way, the total amount of a monofunctional monomer, other than the N-vinyl monomer, a multifunctional monomer, a passive resin and a radiation-curable oligomer.

It has surprisingly been found that the inkjet ink used in the method of the present invention has a high cure speed despite restricting the combined amount of a monofunctional monomer, other than the N-vinyl monomer, a multifunctional monomer, a passive resin and a radiation-curable oligomer to 9% or less by weight, based on the total weight of the ink.

The ink used in the method of the present invention may also include radiation-curable material which is capable of polymerising by cationic polymerisation. Suitable materials include, oxetanes, cycloaliphatic epoxides, bisphenol A epoxides, epoxy novolacs and the like. The radiation-curable material according to this embodiment may comprise a mixture of cationically curable monomer and oligomer. For example, the radiation-curable material may comprise a mixture of an epoxide oligomer and an oxetane monomer.

Preferably however, the ink used in the method of the present invention cures by free radical polymerisation only and hence the ink is free of radiation-curable material, which polymerises by cationic polymerisation.

The inkjet ink used in the method of the present invention contains a radical photoinitiator.

Free radical photoinitiators can be selected from any of those known in the art. For example, benzophenone, 1-hydroxycyclohexyl phenyl ketone, 1-[4-(2-hydroxyethoxy)-phenyl]-2-hydroxy methyl-1-propane-1-one, 2-benzyl-2-di-methylamino-(4-morpholinophenyl)butan-1-one, isopropyl thioxanthone, benzil dimethylketal, 2,4,6-trimethylbenzoyl-diphenylphosphine oxide, bis(2,4,6-trimethylbenzoyl)-phenylphosphine oxide and bis(2,6-dimethylbenzoyl)-2,4,4-trimethylpentylphosphine oxide. Such photoinitiators are known and commercially available such as, for example, under the trade names Irgacure, Darocur (from Ciba) and Lucirin (from BASF).

In a preferred embodiment, the photoinitiator present in the ink used in the method of the present invention is tailored for UV LED light. By tailored for UV LED light, it is meant that the photoinitiators absorb the radiation which is emitted by the UV LED light source. Preferably, the photoinitiator present in the ink used in the method of the present invention absorbs radiation in a region of from 360 nm to 410 nm and absorbs sufficient radiation to cure the ink within a 50 nm or less, preferably 30 nm or less, most preferably 15 nm or less bandwidth.

In a preferred embodiment, the photoinitiator comprises a phosphine oxide photoinitiator, such as TPO and BAPO, and/or a thioxanthone photoinitiator, such as ITX. In a particularly preferred embodiment, the inkjet ink used in the method of the present invention comprises two or more photoinitiators. In a particularly preferred embodiment, the inkjet ink comprises a radical photoinitiator selected from isopropyl thioxanthone (ITX), 2,4,6-trimethylbenzoyl-di-phenylphosphine oxide (TPO) and mixtures thereof.

In a preferred embodiment, the inkjet ink comprises 1-20% by weight of a radical photoinitiator, based on the total weight of the ink.

In the embodiment where the ink comprises radiation-curable material, which polymerises by cationic polymerisation, the ink must also comprise a cationic photoinitiator.

In the case of a cationically curable system, any suitable cationic initiator can be used, for example sulfonium or iodonium based systems. Non limiting examples include: Rhodorsil PI 2074 from Rhodia; MC AA, MC BB, MC CC, MC CC PF, MC SD from Siber Hegner; UV9380c from Alfa Chemicals; Uvacure 1590 from UCB Chemicals; and Esacure 1064 from Lamberti spa.

The inkjet ink used in the method of the present invention preferably contains a colouring agent.

The inkjet ink used in the method of the present invention preferably further comprises a colouring agent, which may be either dissolved or dispersed in the liquid medium of the ink. The colouring agent can be any of a wide range of suitable colouring agents that would be known to the person skilled in the art.

Preferably, the colouring agent is a dispersed pigment, of the types known in the art and commercially available such as under the trade-names Paliotol (available from BASF plc), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7. Especially useful are black and the colours required for trichromatic process printing. Mixtures of pigments may be used.

In one aspect the following pigments are preferred. Cyan: phthalocyanine pigments such as Phthalocyanine blue 15.4. Yellow: azo pigments such as Pigment yellow 120, Pigment yellow 151 and Pigment yellow 155. Magenta: quinacridone pigments, such as Pigment violet 19 or mixed crystal quinacridones such as Cromophtal Jet magenta 2BC and Cinquasia RT-355D. Black: carbon black pigments such as Pigment black 7.

Pigment particles dispersed in the ink should be sufficiently small to allow the ink to pass through an inkjet nozzle, typically having a particle size less than 8 µm, preferably less than 5 µm, more preferably less than 1 µm and particularly preferably less than 0.5 µm.

The colorant is preferably present in an amount of 0.2-20% by weight, preferably 0.5-10% by weight, based on the total weight of the ink. A higher concentration of pigment may be required for white inks, for example up to and including 30% by weight, or 25% by weight, based on the total weight of the ink.

In a preferred embodiment, the ink used in the method of the present invention comprises a black colouring agent, and preferably a black pigment. The black pigment is dispersed in the liquid medium of the ink and is typically in the form of a powdered black pigment. A preferred black pigment is carbon black, more specifically MOGUL E available from Cabot Corporation. In a preferred embodiment, the ink comprises 1-10% by weight of the black pigment, based on the total weight of the ink.

In a preferred embodiment, the inkjet ink used in the method of the present invention comprises 5-40% by weight of the N-vinyl monomer, based on the total weight of the ink, and the ink further comprises: 9% or less by weight of a monofunctional monomer, other than the N-vinyl monomer, together with a multifunctional monomer, based on the total weight of the ink; 5% or less by weight of a passive resin, based on the total weight of the ink; and a colouring agent.

In an alternative preferred embodiment, the inkjet ink used in the method of the present invention comprises 5-40% by weight of the N-vinyl monomer, based on the total weight of the ink, wherein the only radiation-curable functional groups present in the one or more difunctional monomers are (meth)acrylate groups, and the ink further comprises: 9% or less by weight of a monofunctional monomer, other than the N-vinyl monomer, together with a multifunctional monomer, based on the total weight of the ink; and a colouring agent.

The inkjet ink used in the method of the present invention dries primarily by curing, i.e. by the polymerisation of the monomers present, as discussed hereinabove, and hence is a curable ink. The ink does not, therefore, require the presence of water or a volatile organic solvent to effect drying of the ink. The absence of water and volatile organic solvents means that the ink does not need to be dried to remove the water/solvent. However, water and volatile organic solvents have a significant viscosity-lowering effect making formulation of the ink in the absence of such components significantly more challenging.

Accordingly, the inkjet ink used in the method of the present invention is preferably substantially free of water and volatile organic solvents. Preferably, the inkjet ink comprises less than 5% by weight of water and volatile organic solvent combined, preferably less than 3% by weight combined, more preferably, less than 2% by weight combined and most preferably less than 1% by weight combined, based on the total weight of the ink. Some water will typically be absorbed by the ink from the air and solvents may be present as impurities in the components of the inks, but such low levels are tolerated.

The inkjet ink used in the method of the present invention exhibits a desirable low viscosity (200 mPas or less, preferably 100 mPas or less, more preferably 25 mPas or less and most preferably 15 mPas or less at 25° C.). The inks used in the method of the invention are thus capable of being printed and cured at line speeds in excess of 150 m/min, preferably in excess of 170 m/min up to 300 m/min.

In order to produce a high quality printed image a small jetted drop size is desirable. Preferably the inkjet ink is jetted at drop sizes below 50 picolitres, preferably below 30 picolitres and most preferably below 10 picolitres.

To achieve compatibility with print heads that are capable of jetting drop sizes of 50 picolitres or less, a low viscosity ink is required. A viscosity range of 10 to 20 mPas at 25° C. is preferred, more preferably 12 to 18 mPas at 25° C. and most preferably 14 to 16 mPas at 25° C.

Ink viscosity may be measured using a Brookfield viscometer fitted with a thermostatically controlled cup and spindle arrangement, such as a DV1 low-viscosity viscometer running at 20 rpm at 25° C. with spindle 00.

In a preferred embodiment, the ink used in the method of the present invention comprises a surfactant. The surfactant controls the surface tension of the ink. Surfactants are well known in the art and a detailed description is not required. An example of a suitable surfactant is Surfynol 465 (available from Evonik). Adjustment of the surface tension of the inks allows control of the surface wetting of the inks on various substrates, for example, plastic substrates. Too high a surface tension can lead to ink pooling and/or a mottled appearance in high coverage areas of the print. Too low a surface tension can lead to excessive ink bleed between different coloured inks. Surface tension is also critical to ensuring stable jetting (nozzle plate wetting and sustainability). The surface tension is preferably in the range of 20-40 $mNm^{-1}$ and more preferably 25-35 $mNm^{-1}$.

Other components of types known in the art may be present in the ink used in the method of the present invention to improve the properties or performance. These components may be, for example, defoamers, dispersants, stabilisers against deterioration by heat or light, reodorants, flow or slip aids, biocides and identifying tracers. In a preferred embodiment, photosensitisers are added to the ink, which are selected to absorb strongly in the desired wavelength band of UV LED radiation source and are able to transfer energy to the photoinitiators of the ink.

Print heads account for a significant portion of the cost of an entry level printer and it is therefore desirable to keep the number of print heads (and therefore the number of inks in the ink set) low. Reducing the number of print heads can reduce print quality and productivity. It is therefore desirable to balance the number of print heads in order to minimise cost without compromising print quality and productivity.

The present invention may also use an inkjet ink set wherein at least one of the inks in the set is an inkjet ink used in the method of the present invention. Preferably, all of the inks in the set fall within the scope of the inkjet ink used in the method of the present invention.

Usually, the inkjet ink set used in the method of the present invention is in the form of a multi-chromatic inkjet ink set, which typically comprises a cyan ink, a magenta ink, a yellow ink and a black ink (a so-called trichromatic set). This set is often termed CMYK. The inks in a trichromatic set can be used to produce a wide range of colours and tones. Other inkjet ink sets may also be used, such as CMYK+ white and light colours.

The inkjet ink may be prepared by known methods such as stirring with a high-speed water-cooled stirrer, or milling on a horizontal bead-mill.

In the method of inkjet printing of the present invention, the inkjet ink is printed onto a substrate. Printing is performed by inkjet printing, e.g. on a single-pass inkjet printer, for example for printing (directly) onto a substrate, on a roll-to-roll printer or a flat-bed printer. As discussed above, inkjet printing is well known in the art.

The ink is jetted from one or more reservoirs or printing heads through narrow nozzles on to the substrate to form a printed image. The substrate is not limited. Examples of substrates include those composed of PVC, polyester, polyethylene terephthalate (PET), PETG, polyethylene (PE), polypropylene (PP), and mixtures thereof in a laminated film such as laminates of PE and PET. Further substrates include all cellulosic materials such as paper and board, or their mixtures/blends with the aforementioned synthetic materials. Such substrates are suitable as labels.

In inkjet printing, the inkjet printhead moves relative to the substrate from one end of the substrate to another laying down the ink on the substrate as it passes over the substrate. This movement of the printhead relative to the substrate is termed a "single pass" of the inkjet head relative to the substrate. The ink that is applied to the substrate during this single pass may form the whole image or a part of the image. Where the whole image is formed, no further passes of the printhead over the substrate are required and the technique is termed "single-pass" printing. Where only part of the image is formed, further passes of the printhead are required and the technique is termed "multi-pass" printing. Thus, multi-pass mode occurs when not all of the ink required for the complete image on a substrate is applied during one pass of the printhead over the substrate.

In a preferred embodiment, the method of inkjet printing of the present invention is single-pass printing.

The method of inkjet printing of the present invention further comprises: (ii) curing the ink by exposing the printed ink to a UV radiation source, wherein the UV radiation source moves relative to the substrate at a speed of 70 m/min or more.

In the method of the present invention, after inkjet printing the inkjet ink onto the substrate, the printed image is then exposed to a UV radiation source, preferably UV LED light, to cure the inkjet ink.

Any suitable radiation source may be used. Suitable UV sources include mercury discharge lamps, fluorescent tubes, light emitting diodes (LEDs), flash lamps and combinations thereof. In a preferred embodiment, a UV LED light source is used to cure the ink. In this embodiment, the inkjet ink is cured by UV LED light. The inventors have surprisingly found that the ink used in the method of the present invention is particularly suitable as an ink which can be cured using a UV LED light source, whilst maintaining low viscosity and full cure at high speed.

UV LED light is emitted from a UV LED light source. UV LED light sources comprise one or more LEDs and are well known in the art. Thus, a detailed description is not required.

It will be understood that UV LED light sources emit radiation having a spread of wavelengths. The emission of UV LED light sources is identified by the wavelength which corresponds to the peak in the wavelength distribution. Compared to conventional mercury lamp UV sources, UV LED light sources emit UV radiation over a narrow range of wavelengths on the wavelength distribution. The width of the range of wavelengths on the wavelength distribution is called a wavelength band. LEDs therefore have a narrow wavelength output when compared to other sources of UV radiation. By a narrow wavelength band, it is meant that at least 90%, preferably at least 95%, of the radiation emitted from the UV LED light source has a wavelength within a wavelength band having a width of 50 nm or less, preferably, 30 nm or less, most preferably 15 nm or less.

In a preferred embodiment, at least 90%, preferably at least 95%, of the radiation emitted from the UV LED light source has a wavelength in a band having a width of 50 nm or less, preferably 30 nm or less, most preferably 15 nm or less.

Preferably, the wavelength of the UV LED source substantially matches the absorption profile of the ink. In a preferred embodiment, the wavelength distribution of the UV LED light peaks at a wavelength of from 360 nm to 410 nm. In a particularly preferred embodiment, the wavelength distribution of the UV LED light peaks at a wavelength of around 365 nm, 395 nm, 400 nm or 405 nm.

In a particularly preferred embodiment, the wavelength distribution of the UV LED light peaks at a wavelength of from 360 nm to 410 nm, and at least 90%, preferably at least 95%, of the radiation has a wavelength in a band having a width of 50 nm or less, preferably 30 nm or less, most preferably 15 nm or less. In a particularly preferred embodiment, the wavelength distribution of the UV LED light peaks at a wavelength of around 365 nm, 395 nm, 400 nm or 405 nm, and at least 90%, preferably at least 95%, of the radiation has a wavelength in a band having a width of 50 nm or less, preferably 30 nm or less, most preferably 15 nm or less.

LEDs have a longer lifetime and exhibit no change in the power/wavelength output over time. LEDs also have the advantage of switching on instantaneously with no thermal stabilisation time and their use results in minimal heating of the substrate.

Upon exposure to a radiation source, the ink cures to form a relatively thin polymerised film. The ink used in the method of the present invention typically produces a printed film having a thickness of 1 to 20 µm, preferably 1 to 10 µm, for example 2 to 5 µm. Film thicknesses can be measured using a confocal laser scanning microscope.

The exposure to UV LED light may be performed in an inert atmosphere, e.g. using a gas such as nitrogen, in order to assist curing of the ink, although this is not required to achieve full cure, including surface cure owing to the components present in the ink used in the method of the present invention.

In the method of inkjet printing of the present invention, the UV radiation source moves relative to the substrate at a speed of 70 m/min or more. The method is thus a method of high-speed printing.

The inkjet ink used in the method of the present invention is particularly suitable for high-speed printing applications. High-speed printing is a term of the art.

In high-speed printing, the UV radiation source moves relative to the substrate at a speed of 50 m/min or more. In the method of the present invention, the UV radiation source moves relative to the substrate at a speed of 70 m/min or more, preferably 90 m/min or more, more preferably 100 m/min or more. In some embodiments, the UV radiation source moves relative to the substrate at a speed of 150 m/min or more, preferably 170 m/min or more. Typically, the UV radiation source can move relative to the substrate at a speed of up to 300 m/min. But for some applications, the speed can be even higher than 300 m/min.

The advantage of high-speed printing is that a low dose per unit area is required to achieve a fully cured film. Full cure of the ink can be determined by assessing both surface cure and through cure. Surface cure can be assessed using strips of photo paper and ensuring no tackiness is present. Through cure can be assessed using the finger nail scratch test, ensuring that the ink cannot be removed by finger nail scratch. Preferably, the maximum dose per unit required for full cure is 440 mJ/cm$^2$, more preferably 400 mJ/cm$^2$, most preferably 350 mJ/cm$^2$. The minimum dose per unit required for full cure is 100 mJ/cm$^2$, more preferably 150 mJ/cm$^2$, most preferably 200 mJ/cm$^2$.

It is surprising that the N-vinyl monomer in combination with the one or more difunctional monomers enables the ink to be fully cured using such a high cure speed of 70 m/min or more, whilst maintaining a high-quality image.

In a preferred embodiment, the method of inkjet printing of the present invention is high-speed single-pass inkjet printing.

In a particularly preferred embodiment, the method of inkjet printing of the present invention is high-speed single-pass label inkjet printing.

The present invention may also provide a cartridge containing the inkjet ink used in the method as defined herein. It may also provide a printed substrate having the ink used in the method as defined herein printed thereon.

The invention will now be described with reference to the following examples, which are not intended to be limiting.

EXAMPLES

Example 1

Inks were prepared by mixing the components in the amounts shown in Table 1. Amounts are given as weight percentages based on the total weight of the ink.

TABLE 1

|  |  | Examples | | Comparative Examples | | | |
|---|---|---|---|---|---|---|---|
| Material | Description | Ink 1 | Ink 2 | Ink 3 w/w % | Ink 4 | Ink 5 | Ink 6 |
| HDDA | Difunctional monomer | 36.5 | 58.4 | 73 | | | 36.5 |
| NVC | Monofunctional monomer | 36.5 | 14.6 | | 73 | | |
| 2-PEA | Monofunctional monomer | | | | | 73 | 36.5 |
| Irgastab UV22 | Stabiliser | 0.5 | 0.5 | 0.5 | 0.5 | 0.5 | 0.5 |
| Black pigment dispersion | Black pigment dispersion | 10 | 10 | 10 | 10 | 10 | 10 |
| Omnirad 819 (BAPO) | Photoinitiator | 3 | 3 | 3 | 3 | 3 | 3 |
| Speedcure TPO | | 10 | 10 | 10 | 10 | 10 | 10 |
| Speedcure ITX | | 3 | 3 | 3 | 3 | 3 | 3 |
| Byk 307 | Surfactant | 0.5 | 0.5 | 0.5 | 0.5 | 0.5 | 0.5 |
| Total | | 100 | 100 | 100 | 100 | 100 | 100 |
| Viscosity @ 25° C./mPa · s | | 11.4 | 11.8 | 12.0 | 11.3 | 18.6 | 14.4 |

TPO is diphenyl,-(2,4,6-trimethyl benzoyl) phosphine oxide. ITX is isopropylthioxanthone. BAPO is bis(2,4,6-trimethyl benzoyl) phenyl phosphine oxide.

The black pigment dispersion contains 40 wt % of carbon black pigment, based on the total weight of the dispersion. It also contains a polymer dispersant and a difunctional monomer (a divinyl ether monomer).

The inks were drawn down onto Genotherm 220 micron semi rigid PVC using a 12 micron wire wound K-bar, and cured using a Phoseon 20W 395 nm LED lamp. The cure speed was measured. Full cure of the ink was determined by assessing both surface cure and through cure. Surface cure was assessed using strips of photo paper and ensuring no tackiness was present. Through cure was assessed using the finger nail scratch and cross hatch adhesion test, ensuring that the ink could not be removed by finger nail scratch.

The results are set out in Table 2.

TABLE 2

|  |  | Maximum Belt Speed For Cure/m · min$^{-1}$ |
|---|---|---|
| Examples | Ink 1 | >100 |
|  | Ink 2 | >100 |
| Comparative examples | Ink 3 | 40 |
|  | Ink 4 | <30 |
|  | Ink 5 | <30 |
|  | Ink 6 | 30 |

As can be seen from Table 2, inks 1 and 2, which are inks of the invention, show that by blending NVC with a difunctional monomer (HDDA in this case), high cure speeds are surprisingly attained (>100 m/min).

Comparative ink 3, which contains HDDA (a difunctional monomer) but does not contain NVC, has a moderate cure speed of 40 m/min, which is typical of an ink containing a difunctional monomer.

Comparative ink 4, which contains NVC but does not contain a difunctional monomer, does not cure under these conditions. It requires multiple passes at 30 m/min to achieve any degree of cure. This is what would be expected of an ink containing a low cure speed monomer of NVC.

Comparative ink 5, which contains PEA (as opposed to NVC) and does not contain a difunctional monomer, does not cure under these conditions. It requires multiple passes at 30 m/min to achieve any degree of cure. This is what would be expected of an ink containing a low cure speed monomer of PEA.

Comparative ink 6, which is comparable to ink 1 but contains PEA as the monofunctional monomer, instead of NVC, has a cure speed of 30 m/min. This cure speed is less than the cure speed of comparative ink 3. This is what we would expect in that the addition of PEA (a monomer which provides low cure speed as evidenced by comparative ink 5), to an ink containing difunctional monomer (a monomer which provides moderate cure speed as evidence by comparative ink 3) reduces the overall cure speed of the ink.

It is surprising that inks 1 and 2, which contain NVC (a monomer which provides low cure speed as evidenced by comparative ink 4) and a difunctional monomer (a monomer which provides moderate cure speed as evidenced by comparative ink 3) have a high cure speed. In particular, that inks 1 and 2 have a higher cure speed than comparative ink 3. This increased cure speed cannot be seen when an alternative monofunctional monomer (e.g. PEA) is included, as evidenced by comparative ink 6.

Example 2

Inks were prepared by mixing the components in the amounts shown in Table 3. Amounts are given as weight percentages based on the total weight of the ink.

TABLE 3

|  |  | Examples | | | | Comparative Example |
|---|---|---|---|---|---|---|
| Material | Description | Ink 1 | Ink 7 | Ink 8 | Ink 9 | Ink 3 |
|  |  | w/w % | | | | |
| HDDA | Difunctional monomer | 36.5 | 45.6 | 54.8 | 63.9 | 73 |
| NVC | Monofunctional monomer | 36.5 | 27.4 | 18.2 | 9.1 |  |
| Irgastab UV22 | Stabiliser | 0.5 | 0.5 | 0.5 | 0.5 | 0.5 |
| Black pigment dispersion | Black pigment dispersion | 10 | 10 | 10 | 10 | 10 |
| Omnirad 819 (BAPO) | Photoinitiator | 3 | 3 | 3 | 3 | 3 |
| Speedcure TPO |  | 10 | 10 | 10 | 10 | 10 |
| Speedcure ITX |  | 3 | 3 | 3 | 3 | 3 |
| Byk 307 | Surfactant | 0.5 | 0.5 | 0.5 | 0.5 | 0.5 |
| Total |  | 100 | 100 | 100 | 100 | 100 |
| Viscosity @ 25° C./mPa · s |  | 10.9 | 11.0 | 11.2 | 11.2 | 11.3 |

TPO is diphenyl,-(2,4,6-trimethyl benzoyl) phosphine oxide. ITX is isopropylthioxanthone. BAPO is bis(2,4,6-trimethyl benzoyl) phenyl phosphine oxide.

The black pigment dispersion contains 40 wt % of carbon black pigment, based on the total weight of the dispersion. It also contains a polymer dispersant and a difunctional monomer (a divinyl ether monomer).

The inks were drawn down onto Genotherm 220 micron semi rigid PVC using an 8 micron wire wound K-bar, and cured using a Phoseon 20W 395 nm LED lamp. The cure response was assessed by measuring the minimum dose per unit area required to achieve a fully cured film. Full cure of the ink was determined by assessing both surface cure and through cure. Surface cure was assessed using strips of photo paper and ensuring no tackiness was present. Through cure was assessed using the finger nail scratch test, ensuring that the ink could not be removed by finger nail scratch.

The results are set out in Table 4 and are shown graphically in FIG. 1.

TABLE 4

|  |  | Dose Required For Cure/mJ/cm² |
|---|---|---|
| Examples | Ink 1 | 274 |
|  | Ink 7 | 235 |
|  | Ink 8 | 211 |
|  | Ink 9 | 352 |
| Comparative example | Ink 3 | 446 |

As can be seen from Table 4 and FIG. 1, inks 1 and 7-9, which are inks of the invention, show that the addition of NVC in the claimed range to a difunctional monomer (HDDA in this case) enhances cure, as evidenced by the reduced doses of 211-352 mJ/cm² required for cure, compared with comparative ink 3.

Comparative ink 3, which contains HDDA (a difunctional monomer) but does not contain NVC, requires a relatively high dose of 446 mJ/cm² for cure, which is typical of an ink containing a difunctional monomer.

Example 3

Inks were prepared by mixing the components in the amounts shown in Table 5. Amounts are given as weight percentages based on the total weight of the ink.

TABLE 5

|  |  | Comparative Examples | | | | |
|---|---|---|---|---|---|---|
| Material | Description | Ink 10 | Ink 11 | Ink 12 | Ink 13 | Ink 3 |
|  |  | w/w % | | | | |
| HDDA | Difunctional monomer | 36.5 | 45.6 | 54.8 | 63.9 | 73 |
| 2-PEA | Monofunctional monomer | 36.5 | 27.4 | 18.2 | 9.1 |  |
| Irgastab UV22 | Stabiliser | 0.5 | 0.5 | 0.5 | 0.5 | 0.5 |
| Black pigment dispersion | Black pigment dispersion | 10 | 10 | 10 | 10 | 10 |
| Omnirad 819 (BAPO) | Photoinitiator | 3 | 3 | 3 | 3 | 3 |
| Speedcure TPO |  | 10 | 10 | 10 | 10 | 10 |
| Speedcure ITX |  | 3 | 3 | 3 | 3 | 3 |
| Byk 307 | Surfactant | 0.5 | 0.5 | 0.5 | 0.5 | 0.5 |
| Total |  | 100 | 100 | 100 | 100 | 100 |
| Viscosity @ 25° C./mPa · s |  | 13.8 | 13.0 | 12.5 | 12.4 | 11.3 |

TPO is diphenyl,-(2,4,6-trimethyl benzoyl) phosphine oxide. ITX is isopropylthioxanthone. BAPO is bis(2,4,6-trimethyl benzoyl) phenyl phosphine oxide.

The black pigment dispersion contains 40 wt % of carbon black pigment, based on the total weight of the dispersion. It also contains a polymer dispersant and a difunctional monomer (a divinyl ether monomer).

The inks were drawn down onto Genotherm 220 micron semi rigid PVC using an 8 micron wire wound K-bar, and cured using a Phoseon 20W 395 nm LED lamp. The cure response was assessed by measuring the minimum dose per unit area required to achieve a fully cured film. Full cure of the ink was determined by assessing both surface cure and through cure. Surface cure was assessed using strips of photo paper and ensuring no tackiness was present. Through cure was assessed using the finger nail scratch test, ensuring that the ink could not be removed by finger nail scratch.

Figure 2:
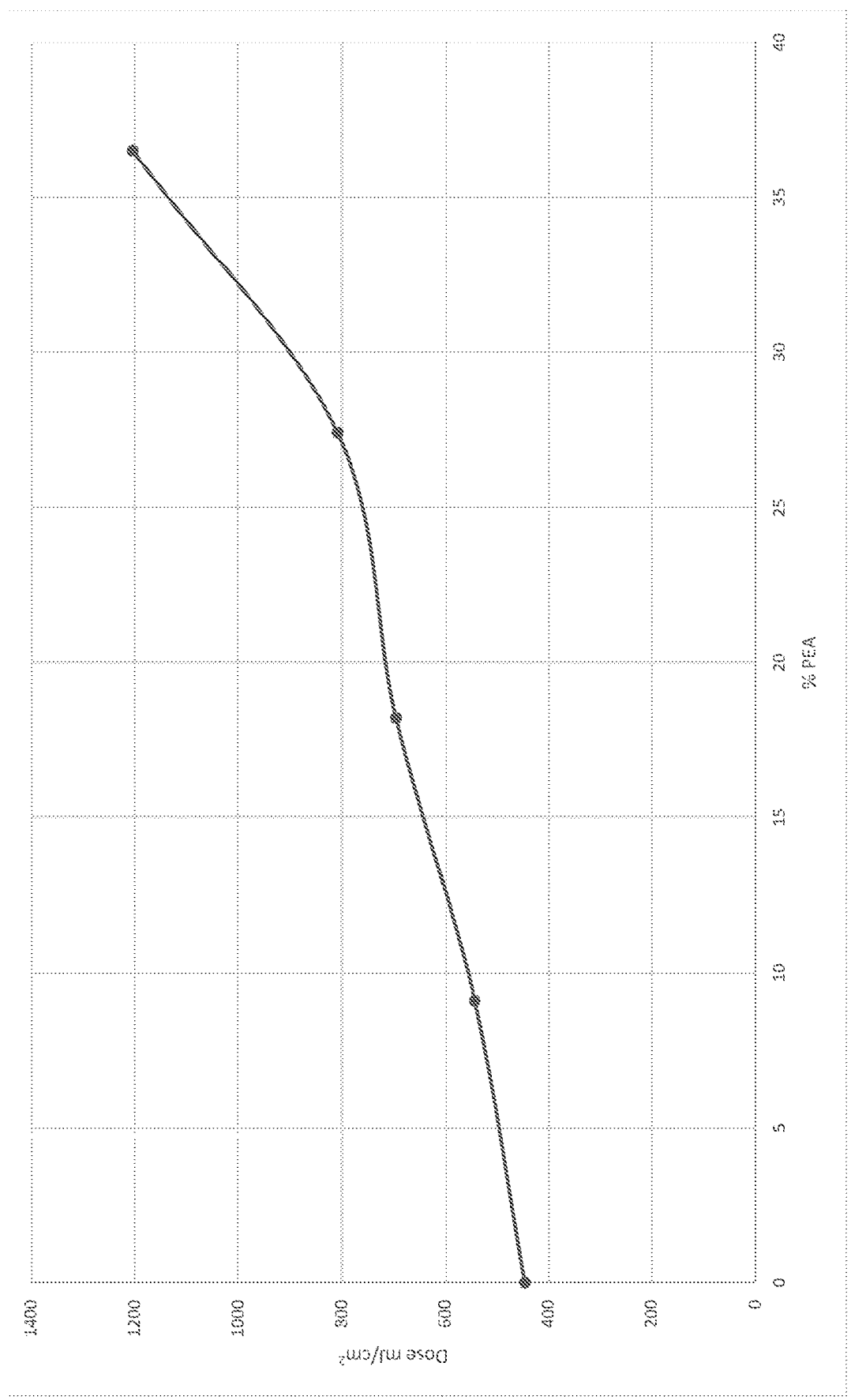
FIG. 2 is a graph showing dose required for cure for comparative inks containing varying amounts of 2-PEA.

The results are set out in Table 6 and are shown graphically in FIG. 2.

TABLE 6

|  |  | Dose Required For Cure/mJ/cm² |
|---|---|---|
| Comparative examples | Ink 10 | 1204 |
|  | Ink 11 | 808 |
|  | Ink 12 | 695 |
|  | Ink 13 | 543 |
|  | Ink 3 | 446 |

The composition of comparative inks 10-13 is the same as inks 1 and 7-9 of the invention except NVC has been replaced with 2-PEA.

As can be seen from Table 6 and FIG. 2, the replacement of the N-vinyl monomer (in this case NVC) with a restricted monofunctional monomer of the invention (in this case 2-PEA) impairs cure, as evidenced by the increased dose required for comparative inks 10-13 and 3, compared with inks 1 and 7-9.

Example 4

Inks were prepared by mixing the components in the amounts shown in Table 7. Amounts are given as weight percentages based on the total weight of the ink.

TABLE 7

|  |  | Comparative Examples | | Example |
|---|---|---|---|---|
|  |  | Ink 14 | Ink 15 | Ink 8 |
| Material | Description | w/w % | | |
| HDDA | Difunctional monomer | 41.0 | 45.6 | 54.8 |
| NVC | Monofunctional monomer | 4.6 | 9.1 | 18.2 |
| 2-PEA | Monofunctional monomer | 27.4 | 18.3 | |
| Irgastab UV22 | Stabiliser | 0.5 | 0.5 | 0.5 |
| Black pigment dispersion | Black pigment dispersion | 10 | 10 | 10 |
| Omnirad 819 (BAPO) | Photoinitiator | 3 | 3 | 3 |
| Speedcure TPO |  | 10 | 10 | 10 |
| Speedcure ITX |  | 3 | 3 | 3 |
| Byk 307 | Surfactant | 0.5 | 0.5 | 0.5 |
| Total |  | 100 | 100 | 100 |
| Viscosity @ 25° C./mPa · s |  | 13.5 | 12.7 | 11.3 |

TPO is diphenyl,-(2,4,6-trimethyl benzoyl) phosphine oxide. ITX is isopropylthioxanthone. BAPO is bis(2,4,6-trimethyl benzoyl) phenyl phosphine oxide.

The black pigment dispersion contains 40 wt % of carbon black pigment, based on the total weight of the dispersion. It also contains a polymer dispersant and a difunctional monomer (a divinyl ether monomer).

The inks were drawn down onto Genotherm 220 micron semi rigid PVC using an 8 micron wire wound K-bar, and cured using a Phoseon 20W 395 nm LED lamp. The cure response was assessed by measuring the minimum dose per unit area required to achieve a fully cured film. Full cure of the ink was determined by assessing both surface cure and through cure. Surface cure was assessed using strips of photo paper and ensuring no tackiness was present. Through cure was assessed using the finger nail scratch test, ensuring that the ink could not be removed by finger nail scratch.

Figure 3:
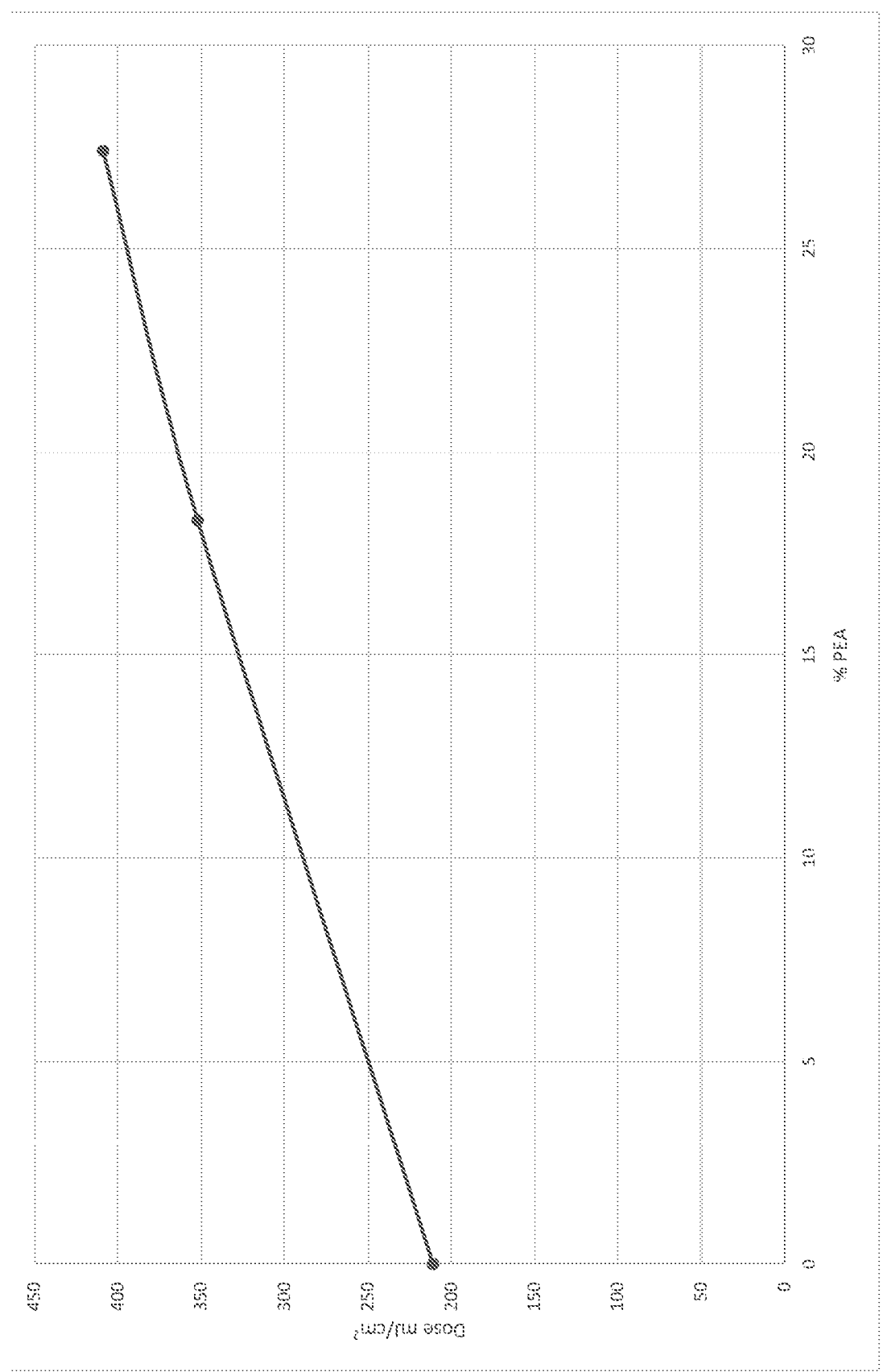
FIG. 3 is a graph showing dose required for cure for comparative inks containing NVC/HDDA/2-PEA blends compared to an ink of the invention containing an NVC/HDDA blend.

The results are set out in Table 8 and are shown graphically in FIG. 3.

TABLE 8

|  |  | Dose Required For Cure/mJ/cm² |
|---|---|---|
| Comparative examples | Ink 14 | 409 |
|  | Ink 15 | 352 |
| Example | Ink 8 | 211 |

As can be seen from Table 8 and FIG. 3, the addition of a restricted monofunctional monomer of the invention (in this case 2-PEA) to the N-vinyl monomer (in this case NVC) and difunctional monomer (in this case HDDA) blend impairs cure, as evidenced by the increased dose required for comparative inks 14 and 15, compared with ink 8. This would translate to considerably slower maximum line speeds in practice.

What is claimed is:

1. A method of inkjet printing, comprising:
   (i) inkjet printing an inkjet ink on to a substrate, wherein the ink comprises: an N-vinyl monomer selected from N-vinyl caprolactam, N-vinyl pyrrolidone, N-vinyl piperidone, N-vinyl carbazole, N-vinyl formamide, N-vinyl indole, N-vinyl imidazole, N-vinyl acetamide, and mixtures thereof; one or more difunctional monomers; and a radical photoinitiator; and
   (ii) curing the ink by exposing the printed ink to a UV radiation source, wherein the UV radiation source moves relative to the substrate at a speed of 70 m/min or more, wherein the ink comprises:
   5-40% by weight of the N-vinyl monomer, based on the total weight of the ink,
   9% or less by weight of a monofunctional monomer, other than the N-vinyl monomer, together with a multifunctional monomer, based on the total weight of the ink;
   5% or less by weight of a passive resin, based on the total weight of the ink; and
   a colouring agent.

2. The method of inkjet printing as claimed in claim 1, where the only radiation-curable functional groups present in the one or more difunctional monomers are (meth) acrylate groups.

3. The method of inkjet printing as claimed in claim 1, wherein the N-vinyl monomer comprises N-vinyl caprolactam (NVC).

4. The method of inkjet printing as claimed in claim 1 comprising 20-80% by weight, preferably 30-60% by weight, of the one or more difunctional monomers, based on the total weight of the ink.

5. The method of inkjet printing as claimed in claim 1, wherein the one or more difunctional monomers comprises hexanediol diacrylate (HDDA).

6. The method of inkjet printing as claimed in claim 1, wherein the ink comprises 5% or less by weight of a radiation-curable oligomer, based on the total weight of the ink.

7. The method of inkjet printing as claimed in claim 1, wherein the ink comprises 5% or less by weight of a passive resin together with a radiation-curable oligomer, based on the total weight of the ink.

8. The method of inkjet printing as claimed in claim 1, wherein the ink comprises 5% or less by weight of a monofunctional monomer, other than the N-vinyl monomer, together with a multifunctional monomer, based on the total weight of the ink.

9. The method of inkjet printing as claimed in claim 1, wherein the ink comprises 5% or less by weight of a monofunctional monomer, other than the N-vinyl monomer, together with a multifunctional monomer, a passive resin and a radiation-curable oligomer, based on the total weight of the ink.

10. The method of inkjet printing as claimed in claim 1, wherein the colouring agent is a dispersed pigment.

11. The method of inkjet printing as claimed in claim 1, wherein the ink is substantially free of: a monofunctional monomer, other than the N-vinyl monomer; a multifunctional monomer; a passive resin; and a radiation-curable oligomer.

12. The method of inkjet printing as claimed in claim 1, wherein the UV radiation source is a UV LED light source.

13. The method of inkjet printing as claimed in claim 1, wherein the UV radiation source moves relative to the substrate at a speed of 90 m/min or more, preferably 100 m/min or more.

* * * * *